(12) United States Patent
Danneels et al.

(10) Patent No.: US 6,393,147 B2
(45) Date of Patent: *May 21, 2002

(54) COLOR REGION BASED RECOGNITION OF UNIDENTIFIED OBJECTS

(75) Inventors: Gunner D. Danneels, Beaverton; Ketan R. Sampat, Portland, both of OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,641

(22) Filed: Apr. 13, 1998

(51) Int. Cl.[7] .................................................. G06K 9/00
(52) U.S. Cl. ...................... 382/165; 382/305; 345/589
(58) Field of Search ................................. 382/165, 162, 382/168, 103, 305, 219, 107, 153, 224; 707/1–10, 506, 528; 358/515; 345/150, 431, 835, 838, 968, 783, 589; 356/326, 406

(56) References Cited

U.S. PATENT DOCUMENTS

| | | | | |
|---|---|---|---|---|
| 5,062,714 A | | 11/1991 | Peterson et al. ............. 356/406 |
| 5,586,197 A | * | 12/1996 | Tsujimura et al. .......... 382/162 |
| 5,619,708 A | * | 4/1997 | Ho ............................ 707/506 |
| 5,633,952 A | * | 5/1997 | Outa et al. ................. 382/165 |
| 5,751,286 A | * | 5/1998 | Barber et al. ............... 345/835 |
| 5,781,899 A | * | 7/1998 | Hirata ........................... 707/6 |
| 5,835,667 A | * | 11/1998 | Wactlar et al. ................ 386/96 |
| 5,841,899 A | | 11/1998 | Ide et al. ..................... 382/168 |
| 5,864,630 A | * | 1/1999 | Cosatto et al. ............. 382/103 |
| 5,872,858 A | | 2/1999 | Kamada et al. ............. 382/107 |
| 5,946,412 A | * | 8/1999 | Nishikawa .................. 382/162 |
| 6,016,487 A | * | 1/2000 | Rioux et al. ................... 707/2 |
| 6,026,411 A | * | 2/2000 | Delp ......................... 707/104.1 |
| 6,031,529 A | * | 2/2000 | Migos et al. ............... 345/783 |
| 6,047,085 A | * | 4/2000 | Sato et al. .................. 382/165 |
| 6,069,696 A | | 5/2000 | McQueen et al. .......... 356/326 |
| 6,188,787 B1 | | 2/2001 | Ohmae et al. ............. 382/165 |
| 6,226,401 B1 | | 5/2001 | Yamafuji et al. ........... 382/165 |

OTHER PUBLICATIONS

Slater et al., The illumination–Invariant–Reconition of 3D Objects Using Local Color Invariant, IEEE vol. 18, No. 2, pp. 206–210, Feb. 1996.*

* cited by examiner

Primary Examiner—Leo Boudreau
Assistant Examiner—Ishrat Sherali
(74) Attorney, Agent, or Firm—Blakely, Sokoloff, Taylor & Zafman LLP (57) ABSTRACT

A machine implemented method is disclosed. The method includes characterizing an object by color regions, and then identifying the object in accordance with at least the color region based characterization of the object. In one embodiment, the method further includes generating output response, such as audio response, in accordance with the identification result.

45 Claims, 6 Drawing Sheets

COLOR REGION BASED RECOGNITION OF UNIDENTIFIED OBJECTS

BACKGROUND OF THE INVENTION

1. Field of the Invention

The present invention relates to the field of computer systems. In particular, the present invention relates to object recognition by computer systems.

2. Background Information

As advances in microprocessor and other related technologies continue to improve the price/performance of various electronic components in recent years, powerful multimedia personal computers (PC) that once were within the exclusive realm of mainframe computers have now become increasingly affordable to the average consumers. More and more homes and classrooms are now equipped with PC for business, education, and/or entertainment purposes.

Numerous advances have also been made in the field of computer vision, i.e. the ability to recognize people, objects, etc., by computers. However, perhaps due to the fact that much of the original interest was motivated by security applications, the techniques known today are generally too computationally intensive (or unnecessary) for use by classroom/home PCs for more casual applications such as education and/or entertainment. Thus, a less computationally intensive and yet sufficiently effective object recognition technique for causal applications is desired.

SUMMARY OF THE INVENTION

A machine implemented method is disclosed. The method includes characterizing an object by color regions, and then identifying the object in accordance with at least the color region based characterization of the object.

In one embodiment, the method further includes generating output responses, such as audio responses, in accordance with the identification result.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of their presentations.

Figure 1:
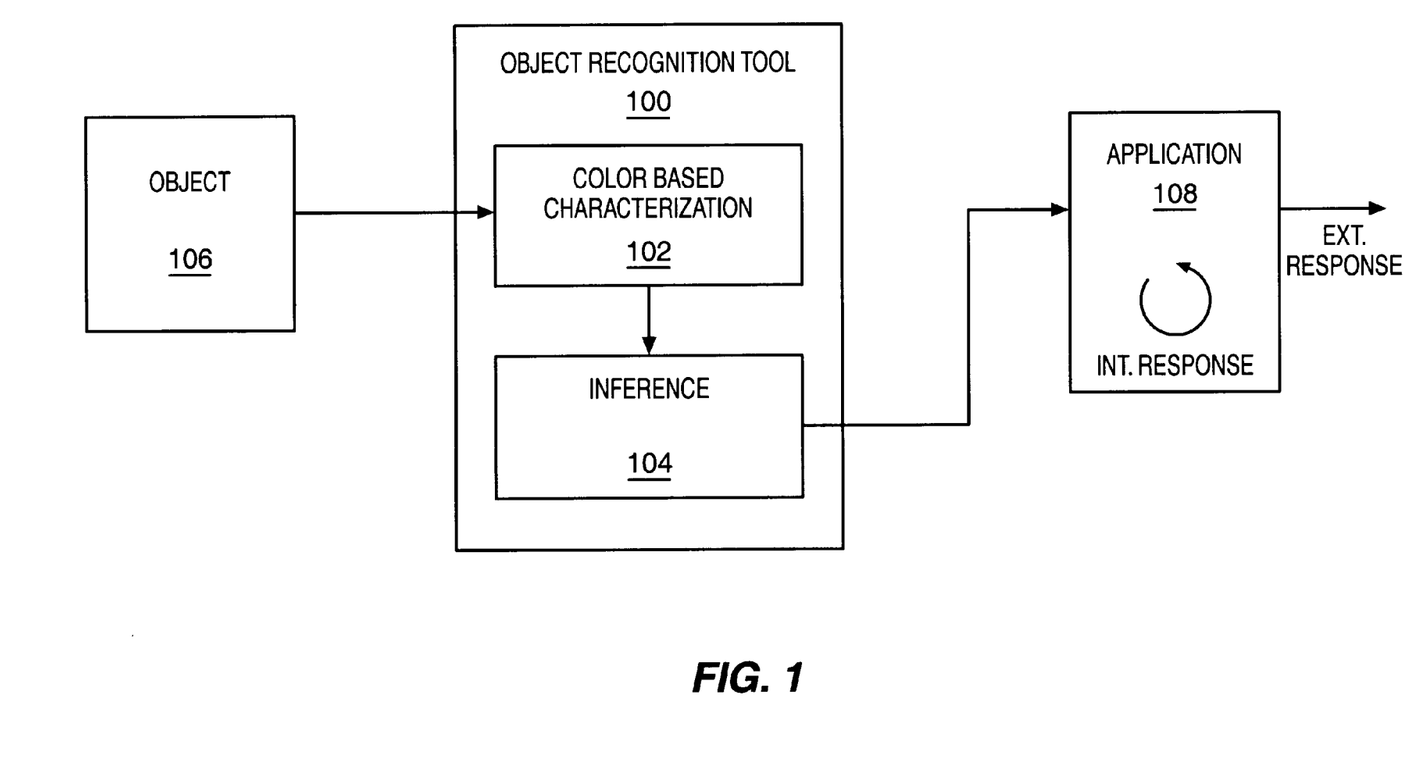
FIG. 1 illustrates an overview of the present invention including the color region based object recognition tool of the present invention.

Referring now to FIG. 1, a block diagram illustrating one embodiment of the present invention is shown. As illustrated, object recognition tool 100 includes color based characterization portion 102 and inference portion 104. As will be described in more detail below, color based characterization portion 102 characterizes an object, such as object 106, based on color regions of the object, and inference portion 104 in turn identifies the object in accordance with at least the color region based characterizations. In one application of the present invention, the identification result is provided to application 108, which in turn responds to the identification results.

Object 106 is intended to represent all physical items that are visually observable. It includes but is not limited to physical items such as a sculpture, a painting, a desk, a table, a fork, a knife, a vase, a stuffed animal, a doll, a book, a page in a book, a flash card, and so forth. Application 108 is intended to represent a broad range of business, education and entertainment applications. The response to the identification result may be externalized, e.g. an audio response, internal only, e.g. changing certain state data, or both.

Figure 2:
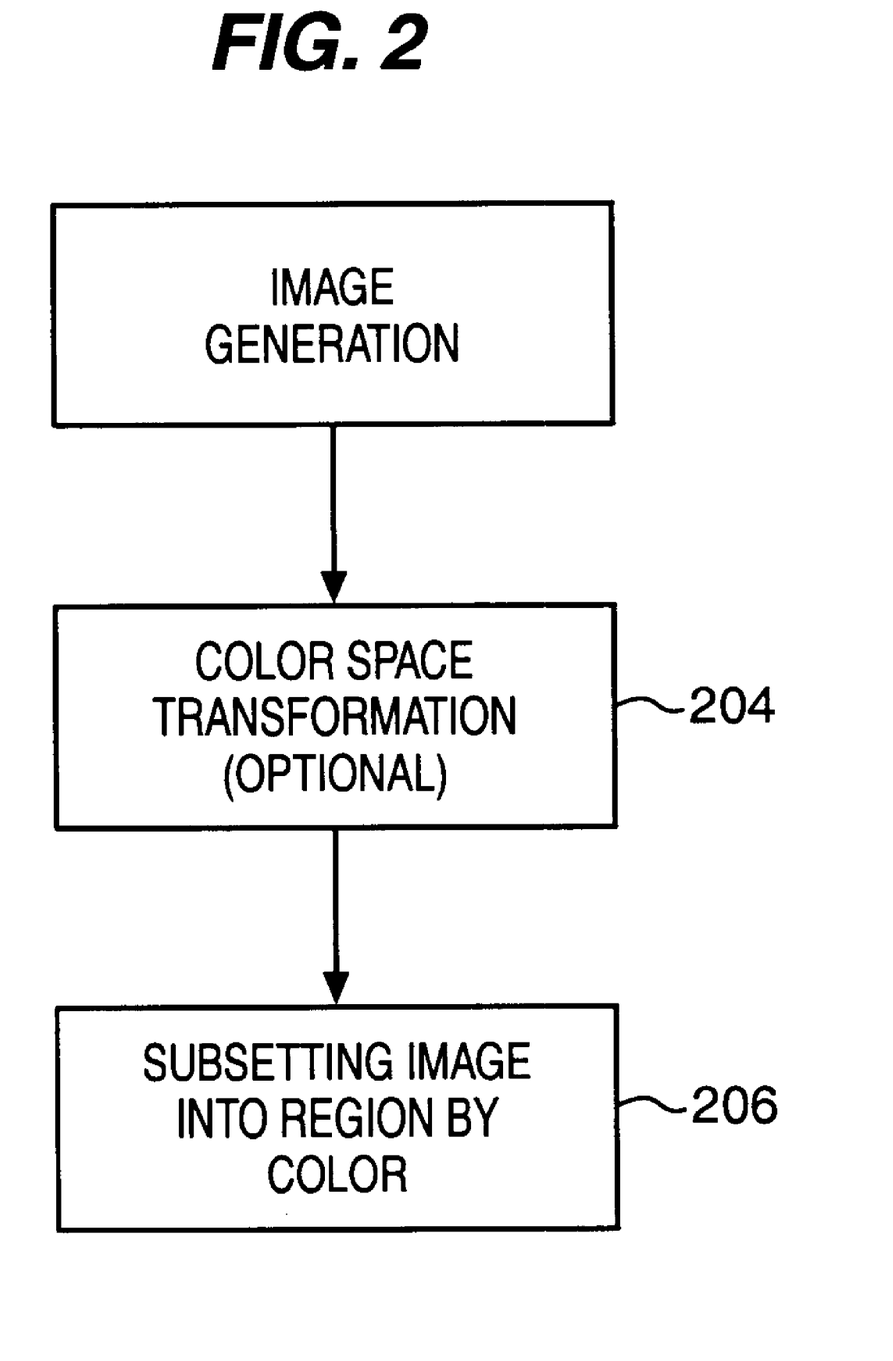
FIG. 2 is a flow chart illustrating one embodiment of the operational flow of the color based characterization portion of the object recognition tool.

FIG. 2 illustrates one embodiment of the operational flow of color based characterization portion 102. As shown, for the illustrated embodiment, color based characterization 102 first generates digitized image data of object 106, e.g. in the form of a frame of video signals, step 202. In one embodiment, the digitized image data are generated as RGB pixel data. In an alternate embodiment, the digitized image data are generated as YUV pixel data instead. Next, color based characterization 102 transforms the pixel data from the RGB/YUV space to the HSI space, step 204. In one embodiment, like variant colors are also transformed into their primary colors to reduce the number of colors, e.g. like variants of the red color (within a predetermined range of degrees in the H index) are all transformed into the red color. Then, color based characterization 102 subsets the image into regions in accordance with the pixels' transformed colors, step 206.

Step 202 may be performed using any one of a number of techniques known in the art, e.g. through a video camera and a capture card. Furthermore, the present invention may be performed without performing step 204. That is, step 206 may be performed with the pixel data in RGB or YUV space, without transforming the pixel data into the HSI space and without collapsing like variant colors into the primary colors. However, experience has shown that the HSI space appears to provide the most consistent result across a wide range of ambient conditions, and collapsing like variant colors into the primary colors reduces the amount of processing without significantly sacrificing the ability to properly recognize an object.

Figure 3:
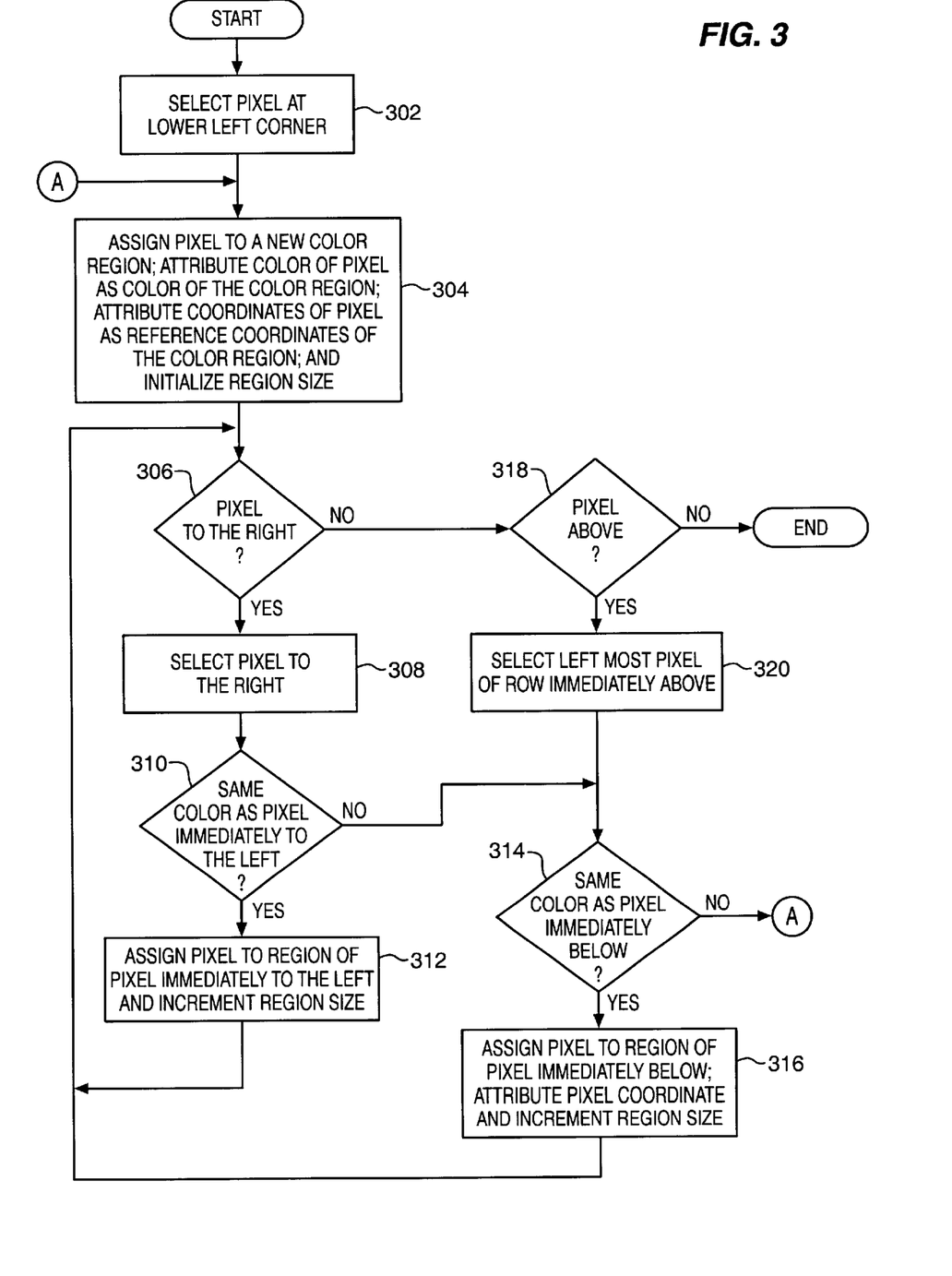
FIG. 3 is a flow chart illustrating in further detail one embodiment of the step of subsetting an image of an object into color regions.

FIG. 3 illustrates one embodiment of step 206 of FIG. 2. As shown, color based characterization portion 102 first selects a pixel at the lower left corner of a frame, step 302. Next, color based characterization portion 102 assigns the pixel to a new color region, step 304. Additionally, color based characterization portion 102 attributes the color of the pixel as the color of the new color region, as well as attributing the coordinates of the pixel as the reference coordinates of the new color region, and initializing the size of the new color region to one pixel.

Then, color based characterization portion 102 determines if there is at least another pixel to the right of the current pixel, step 306. If there is at least another pixel to the right, color based characterization portion 102 selects the pixel immediately to the right, step 308. Upon selecting the pixel immediately to the right, color based characterization portion 102 determines if the selected pixel has the same color as the previous pixel, i.e. the pixel immediately to the left of the now selected pixel, step 310. If the determination is affirmative, color based characterization portion 102 assigns the selected pixel to the same color region of the pixel immediately to its left, and increments the size of the color region by one pixel, step 312; then continues the process at step 306. On the other hand, if the determination is negative, color based characterization portion 102 determines if the selected pixel has the same color as the pixel immediately below it, step 314. If the determination is affirmative, color based characterization portion 102 assigns the pixel to the same color region of the pixel immediately below it, attributes the coordinates of the selected pixel as the reference coordinates of the color region instead, and increments the size of the color region by one pixel, step 316; then continues the process at step 306. On the other hand, if the determination is negative, color based characterization portion 102 continues the process at step 304, i.e. assigning the selected pixel to a new color region, attributing the coordinates of the selected pixel as the reference coordinates of the new color region, and initializing the size of the new color region to one pixel.

Eventually, at step 306, color based characterization portion 102 determines there are no more pixels to the right. Color based characterization portion 102 then continues the process at step 318 wherein it determines if there are pixels above the last processed pixel. If the determination is affirmative, color based characterization portion 102 selects the left most pixel from the row of pixels immediately above, step 320. Upon doing so, color based characterization portion 102 continues the process at step 314 as described earlier.

Eventually, at step 310, color based characterization portion 102 determines there are no more pixels above either, i.e. all pixels of the entire frame have been processed. At such time, the process terminates.

In alternate embodiments, the pixels may be processed in orders other than the left to right and bottom to top manner described earlier. Furthermore, other coordinates beside the coordinates of the top left pixel may be used as the reference coordinates of a color region instead, as well as other metrics may be employed to denote the size of a color region.

Figure 4:
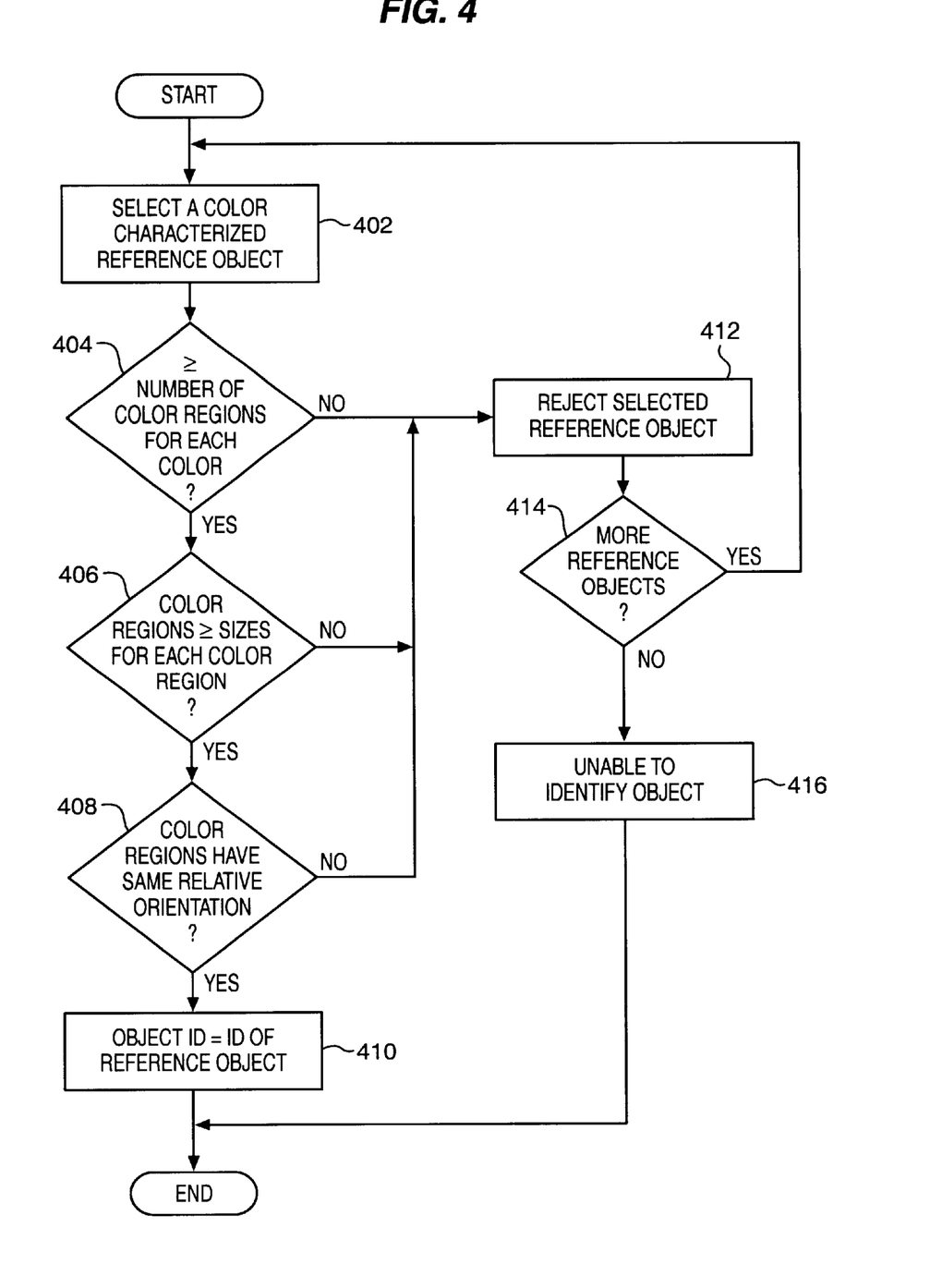
FIG. 4 is a flow chart illustrating one embodiment of the operational flow of the inference portion of the object recognition tool.

FIG. 4 illustrates one embodiment of the operational flow of inference portion 104. As shown, for the illustrated embodiment, inference portion 104 infers the identity of the characterized object by examining a number of color region characterized reference objects of known identities, one at a time. At step 402, a color region characterized reference object of known identity is selected. The color region characterized reference object is analyzed to determine if it contains at least the same number of color regions for each of the different colors as the characterized object whose identity is being determined, step 404. If the color region characterized reference object does not contain at least the same number of color regions for each of the different colors, the color region characterized reference object is rejected, step 412, and the process continues at step 414. For example, if the object whose identity is being determined is characterized as having two red color regions and one blue color regions, then a color region characterized reference object must contain at least two red color regions and at least one blue color region, otherwise the color region characterized reference object is rejected.

Next, the color region characterized reference object is analyzed to determine if the color regions of each of the color groups having at least the same number of color regions have sizes that are at least as large as the color regions of the characterized object whose identity is being determined, step 406. If the color regions of each of the color groups having at least the same number of color regions do not have color regions with the requisite sizes, the color region characterized reference object is rejected, step 412, and the process continues at step 414. For example, if the object whose identity is being determined is characterized as having two red color regions of sizes s1 and s2 and one blue color regions of size s3, then a color region characterized reference object must contain at least two red color regions with sizes that are at least s1 and s2, and at least one blue color region with a size that is at least s3, otherwise the color region characterized reference object is rejected.

Then, the color region characterized reference object is analyzed to determine if the color regions of interest have the same relative orientation to each other as the color regions of the characterized object whose identity is being determined, step 408. If the color region characterized reference object does not contain color regions with the same relative orientation to each other, the color region characterized reference object is rejected, step 412, and the process continues at step 414. In one embodiment, the color regions' relative orientation to each other is determined using the reference coordinates of the color regions. For example, if the object whose identity is being determined is characterized as having two red color regions of sizes s1 and s2 and one blue color regions of size s3, occupying a substantially equilateral triangular orientation (in accordance with their reference coordinates), then a color region characterized reference object must contain at least two red color regions with sizes at least that of s1 and s2, and at least one blue color region with a size that is at least s3, occupying also a similar equilateral triangular orientation (i.e. within certain predetermined tolerance margins), otherwise the color region characterized reference object is rejected. In one embodiment, the predetermined tolerance margins are configurable at set up. In an alternate embodiment, the predetermined tolerance margins are user configurable during operation.

For the illustrated embodiment, if the color region characterized reference object is not rejected at step 408, the determination process terminates, and the identity of the reference object is considered to be the identity of the characterized object, step 410. At step 414, it is determined that whether there are additional reference objects. If there are still additional reference objects available for analysis, the process continues at step 402, otherwise inference portion 104 reports that it is unable to determine the identity of the characterized object, step 416, and the process terminates.

The number of reference objects to be employed is application dependent. Obviously, if more reference objects are employed, then it is less likely that inference portion 104 will be unable to identify an object. In one embodiment, where the number of referenced objects employed is relatively small, all referenced objects are analyzed before a final inference is drawn. While experience has shown merely employing the above described criteria, inference portion 104 is able to effectively recognize objects with a reasonable level of accuracy for a large number of casual applications, those skilled in the art will appreciate that in alternate embodiments, additional criteria may be employed to reduce the likelihood of incorrect inference by inference portion 104.

Figure 5:
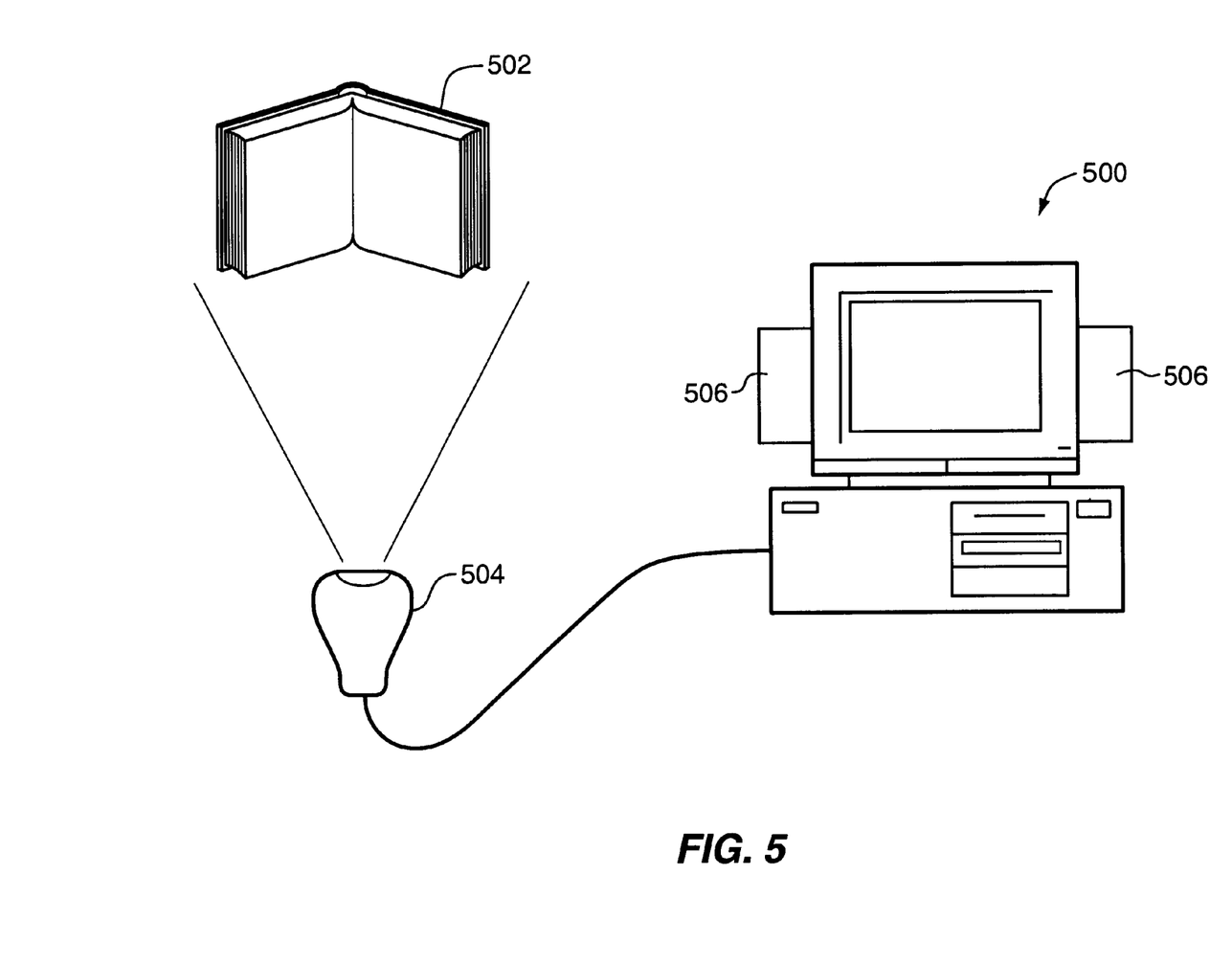
FIG. 5 illustrates an exemplary application of the present invention.

FIG. 5 illustrates an exemplary application of the present application. As illustrated, the application includes the use of multi-media computer 500 to read book 502 for a user. Multi-media computer 500 includes multi-media resources such as video camera 504, a video capture card (not visible), speakers 506, and an audio player (not shown). More importantly, multi-media computer 500 is equipped with the color region base object recognition tool 100 of the present invention described earlier, and color region characterization as well as audio data for each page of book 502. During operation, the color region based region object recognition tool 100 of the present invention identifies the current page book 502 is open to, based at least in part on the color region characterization of the page, using the video image generated by video camera 504 and the associated capture card, and the pre-stored reference color region characterization for each page of the book. In response, the audio player plays the audio data for the page, thereby reading the page for the user.

In one embodiment, multi-media computer 500 is provided with color region characterization and audio data for a number of books, and multi-media computer 500 is further provided with a user interface for the user to inform multi-media computer 500 of the identity of the book, thereby allowing object recognition tool of the present invention to employ the appropriate reference color region characterizations. In an alternate embodiment, the reference color region characterizations are organized by the books, and include color region characterizations for the covers of the books. The object recognition tool 100 of the present invention is further extended to include the selective employment of a subset of the pre-stored reference color region characterizations based on the identification of the book, through color region characterization of the cover and comparison with the pre-stored reference color region characterizations for the covers.

Figure 6:
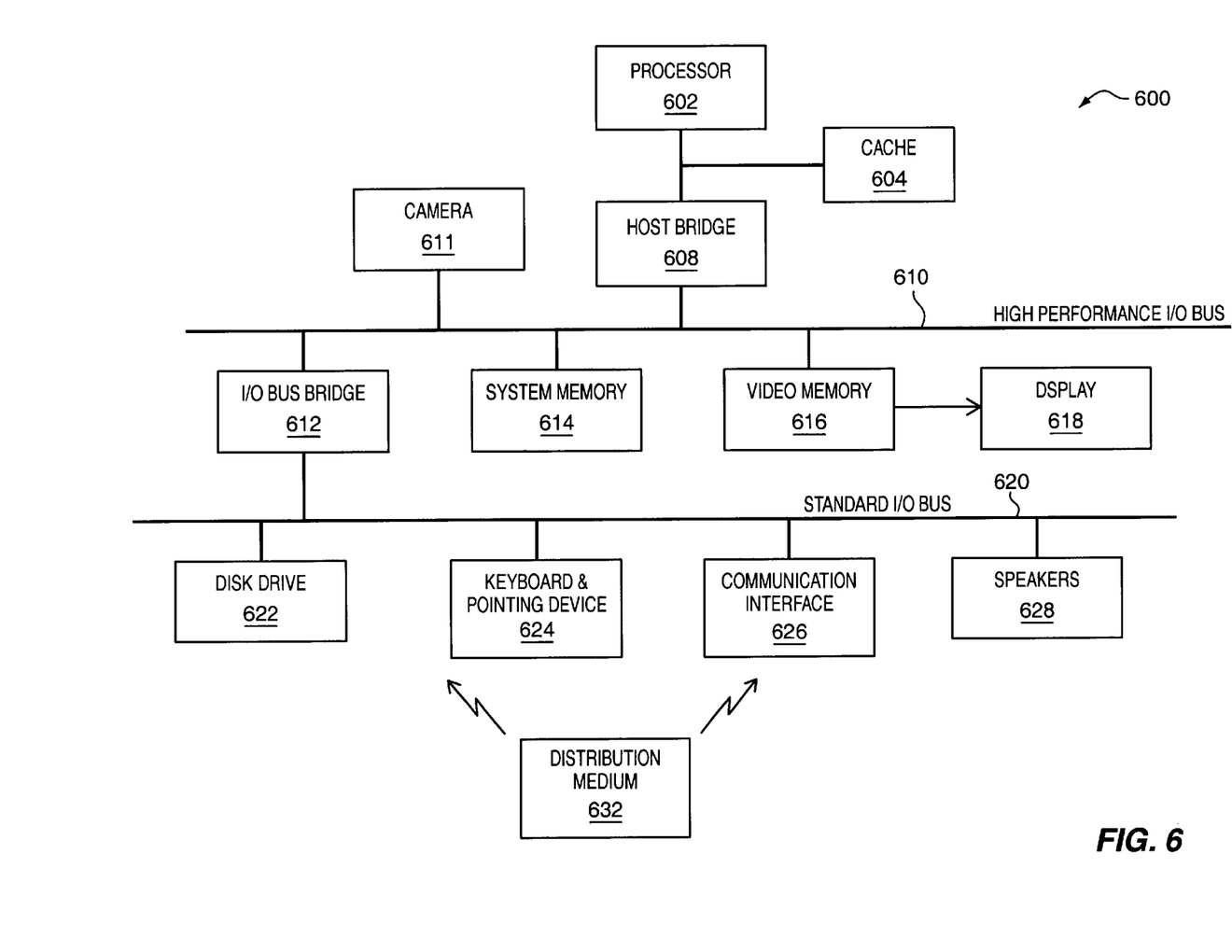
FIG. 6 is a block diagram illustrating a hardware view of one embodiment of a computer suitable for use to practice the present invention.

FIG. 6 illustrates a hardware view of one embodiment of a computer system suitable for practicing the present invention, including the above described application. As shown, for the illustrated embodiment, computer system 600 includes processor 602, processor bus 606, high performance I/O bus 610 and standard I/O bus 620. Processor bus 606 and high performance I/O bus 610 are bridged by host bridge 608, whereas I/O buses 610 and 612 are bridged by I/O bus bridge 612. Coupled to processor bus 606 is cache 604. Coupled to high performance I/O bus 610 are camera, 611, system memory 614 and video memory 616, against which video display 618 is coupled. Coupled to standard I/O bus 620 are disk drive 622, keyboard and pointing device 624, communication interface 626, and speakers 628.

These elements perform their conventional functions known in the art. In particular, disk drive 622 and system memory 614 are used to store permanent and working copies of color region based object recognition tool of the present invention, as well as color region characterization of reference objects and applications that use the color region based object recognition tool. The permanent copies may be pre-loaded into disk drive 622 in factory, loaded from distribution medium 632, or down loaded from a remote distribution source (not shown). The constitutions of these elements are known. Any one of a number of implementations of these elements known in the art may be used to form computer system 600.

In general, those skilled in the art will recognize that the present invention is not limited by the details described, in particular, the present invention is not limited to the exemplary application, instead, the present invention can be practiced with modifications and alterations within the spirit and scope of the appended claims. The description is thus to be regarded as illustrative instead of restrictive on the present invention.

Thus, a method and apparatus for color region based object recognition and application has been described.

What is claimed is:

1. A method comprising:
   capturing an image of each of a plurality of known objects;
   characterizing each image of the plurality of known objects by dividing each image into a plurality of color regions;
   capturing an image of an unidentified object;
   characterizing the image of the unidentified object by dividing the image of the unidentified object into a plurality of color regions; and
   identifying the unidentified object at least in part by:
      comparing the color regions of the image of the unidentified object with the color regions of one or more of the images of the plurality of known objects;
      comparing the number of color regions of each color in the image of the unidentified object to the number of color regions of each color in the image of the first known object;
      comparing the size of each color region of each color in the image of the unidentified object to the size of each color region of each color in the image of the first known object; and
      comparing the relative orientation of each color region of each color in the image of the unidentified object to the relative orientation of each color region of each color in the image of the first known object.

2. The method of claim 1, wherein identifying the unidentified object further comprises rejecting the first known object as the identity of the unidentified object if the number of color regions, the size of color regions, or the relative orientation of color regions of the image of the unidentified object and the image of the first known object do not match within predetermined tolerances.

3. The method of claim 1, wherein characterizing the image of the unidentified object by dividing the image into a plurality of color regions comprises:

identifying the color of each of a plurality of pixels of the image; and assigning each of the plurality of pixels of the image to one of the plurality of color regions of the image.

4. The method of claim 3, wherein characterizing the image of the unidentified object by dividing the image into a plurality of color regions further comprises:

selecting a first pixel of the plurality of pixels of the image and assigning the first pixel to a first color region;

establishing the color of the first pixel as the color of the first color region;

establishing the coordinates of the first pixel as the reference coordinates of the first color region;

selecting a second pixel of the plurality of pixels of the image, wherein the second pixel is adjacent to the first pixel;

if the second pixel is the same color as the first pixel, assigning the second pixel to the first color region; and if the color of the second pixel is different than the color of the first pixel:

assigning the second pixel to a second color region, establishing the color of the second pixel as the color of the second color region, and establishing the coordinates of the second pixel as the reference coordinates of the second color region.

5. The method of claim 4, wherein characterizing the image of the unidentified object by dividing the image into a plurality of color regions further comprises examining each of the remaining pixels of the plurality of pixels of the image and assigning each remaining pixel either to a color region of an adjacent pixel or to a new color region.

6. The method of claim 1, further comprising generating digital image data for the unidentified object.

7. The method of claim 1, wherein the unidentified object comprises a three-dimensional object.

8. The method of claim 1, wherein capturing the image of the unidentified object comprises capturing the image of the unidentified object as a frame of video signals.

9. The method of claim 1, further comprising generating an output response in accordance with the result of identifying the unidentified object.

10. A method comprising:

capturing an image of each of a plurality of known objects;

characterizing each image of the plurality of known objects by dividing each image into a plurality of color regions;

capturing an image of an unidentified object;

characterizing the image of the unidentified object by dividing the image of the unidentified object into a plurality of color regions, comprising:

identifying the color of each of a plurality of pixels of the image, assigning each of the plurality of pixels of the image to one of the plurality of color regions of the image, selecting a first pixel of the plurality of pixels of the image and assigning the first pixel to a first color region, establishing the color of the first pixel as the color of the first color region, establishing the coordinates of the first pixel as the reference coordinates of the first color region, selecting a second pixel of the plurality of pixels of the image, wherein the second pixel is adjacent to the first pixel, if the second pixel is the same color as the first pixel, assigning the second pixel to the first color region, and if the color of the second pixel is different than the color of the first pixel:

assigning the second pixel to a second color region, establishing the color of the second pixel as the color of the second color region, and establishing the coordinates of the second pixel as the reference coordinates of the second color region; and identifying the unidentified object at least in part by comparing the color regions of the image of the unidentified object with the color regions of one or more of the images of the plurality of known objects.

11. The method of claim 10, wherein characterizing the image of the unidentified object by dividing the image into a plurality of color regions further comprises examining each of the remaining pixels of the plurality of pixels of the image and assigning each remaining pixel either to a color region of an adjacent pixel or to a new color region.

12. The method of claim 10, further comprising generating digital image data for the unidentified object.

13. The method of claim 10, wherein the unidentified object comprises a three-dimensional object.

14. The method of claim 10, wherein capturing the image of the unidentified object comprises capturing the image of the unidentified object as a frame of video signals.

15. The method of claim 10, further comprising generating an output response in accordance with the result of identifying the unidentified object.

16. An object recognition apparatus comprising:

an image capturing device to capture the image of an unidentified object;

a memory having stored therein data representing a plurality of images of known objects, wherein the data includes data regarding the characterization of each image of the plurality of known objects obtained by dividing the image into a plurality of color regions; and a processor, wherein the operations of the processor include:

characterizing the image of the unidentified object by dividing the image of the unidentified object into a plurality of color regions, and identifying the unidentified object at least in part by:

comparing the color regions of the image of the unidentified object with the color regions of one or more of the images of the plurality of known objects;

comparing the number of color regions of each color in the image of the unidentified object to the number of color regions of each color in the image of the first known object;

comparing the size of each color region of each color in the image of the unidentified object to the size of each color region of each color in the image of the first known object; and comparing the relative orientation of each color region of each color in the image of the unidentified object to the relative orientation of each color region of each color in the image of the first known object.

17. The apparatus of claim 16, wherein the operation of the processor identifying the unidentified object further comprises rejecting the first known object as the identity of the unidentified object if the number of color regions, the size of color regions, or the relative orientation of color regions of the image of the unidentified object and the image of the first known object do not match within predetermined tolerances.

18. The apparatus of claim 16, wherein the operation of the processor characterizing the unidentified image by dividing the image into a plurality of color regions comprises:
   identifying the color of each of a plurality of pixels of the image; and
   assigning each of the plurality of pixels of the image to one of the plurality of color regions of the image.

19. The apparatus of claim 18, wherein the operation of the processor characterizing the unidentified image by dividing the image into a plurality of color regions further comprises:
   selecting a first pixel of the plurality of pixels of the image and assigning the first pixel to a first color region;
   establishing the color of the first pixel as the color of the first color region;
   establishing the coordinates of the first pixel as the reference coordinates of the first color region;
   selecting a second pixel of the plurality of pixels of the image, wherein the second pixel is adjacent to the first pixel;
   if the second pixel is the same color as the first pixel, assigning the second pixel to the first color region; and
   if the color of the second pixel is different than the color of the first pixel:
      assigning the second pixel to a second color region,
      establishing the color of the second pixel as the color of the second color region, and
      establishing the coordinates of the second pixel as the reference coordinates of the second color region.

20. The apparatus of claim 19, wherein the operation of the processor characterizing the unidentified image by dividing the image into a plurality of color regions further comprises examining each of the remaining pixels of the plurality of pixels of the image and assigning each remaining pixel either to a color region of an adjacent pixel or to a new color region.

21. The apparatus of claim 16, wherein the operations of the processor further comprise generating digital image data of the unidentified object.

22. The apparatus of claim 16, wherein the unidentified object comprises a three-dimensional object.

23. The apparatus of claim 16, wherein the image capturing device captures the image of the unidentified object as a frame of video signals.

24. The apparatus of claim 16, wherein the operations of the processor further comprise generating an output response in accordance with the result of identifying the unidentified object.

25. An object recognition apparatus comprising:
   an image capturing device to capture the image of an unidentified object;
   a memory having stored therein data representing a plurality of images of known objects, wherein the data includes data regarding the characterization of each image of the plurality of known objects obtained by dividing the image into a plurality of color regions; and
   a processor, wherein the operations of the processor include:
      characterizing the image of the unidentified object by dividing the image of the unidentified object into a plurality of color regions, comprising:
         identifying the color of each of a plurality of pixels of the image,
         assigning each of the plurality of pixels of the image to one of the plurality of color regions of the image,
         selecting a first pixel of the plurality of pixels of the image and assigning the first pixel to a first color region;
         establishing the color of the first pixel as the color of the first color region;
         establishing the coordinates of the first pixel as the reference coordinates of the first color region;
         selecting a second pixel of the plurality of pixels of the image, wherein the second pixel is adjacent to the first pixel;
         if the second pixel is the same color as the first pixel, assigning the second pixel to the first color region; and
         if the color of the second pixel is different than the color of the first pixel:
            assigning the second pixel to a second color region,
            establishing the color of the second pixel as the color of the second color region, and
            establishing the coordinates of the second pixel as the reference coordinates of the second color region; and
      identifying the unidentified object at least in part by comparing the color regions of the image of the unidentified object with the color regions of one or more of the images of the plurality of known objects.

26. The apparatus of claim 25, wherein the operation of the processor characterizing the unidentified image by dividing the image into a plurality of color regions further comprises examining each of the remaining pixels of the plurality of pixels of the image and assigning each remaining pixel either to a color region of an adjacent pixel or to a new color region.

27. The apparatus of claim 25, wherein the operations of the processor further comprise generating digital image data of the unidentified object.

28. The apparatus of claim 25, wherein the unidentified object comprises a three-dimensional object.

29. The apparatus of claim 25, wherein the image capturing device captures the image of the unidentified object as a frame of video signals.

30. The apparatus of claim 25, wherein the operations of the processor further comprise generating an output response in accordance with the result of identifying the unidentified object.

31. A machine-readable medium having stored thereon data representing sequences of instructions that, when executed by a processor, cause the processor to perform operations comprising:
   capturing an image of each of a plurality of known objects;
   characterizing each image of the plurality of known objects by dividing each image into a plurality of color regions;
   capturing an image of an unidentified object;
   characterizing the image of the unidentified object by dividing the image of the unidentified object into a plurality of color regions; and
   identifying the unidentified object at least in part by:
      comparing the color regions of the image of the unidentified object with the color regions of one or more of the images of the plurality of known objects,
      comparing the number of color regions of each color in the image of the unidentified object to the number of color regions of each color in the image of the first known object;

comparing the size of each color region of each color in the image of the unidentified object to the size of each color region of each color in the image of the first known object; and comparing the relative orientation of each color region of each color in the image of the unidentified object to the relative orientation of each color region of each color in the image of the first known object.

32. The medium of claim 31, wherein identifying the unidentified object further comprises rejecting the first known object as the identity of the unidentified object if the number of color regions, the size of color regions, or the relative orientation of color regions of the image of the unidentified object and the image of the first known object do not match within predetermined tolerances.

33. The medium of claim 31, wherein characterizing the image of the unidentified object by dividing the image into a plurality of color regions comprises:

identifying the color of each of a plurality of pixels of the image; and assigning each of the plurality of pixels of the image to one of the plurality of color regions of the image.

34. The medium of claim 33, wherein characterizing the image of the unidentified object by dividing the image into a plurality of color regions further comprises:

selecting a first pixel of the plurality of pixels of the image and assigning the first pixel to a first color region;

establishing the color of the first pixel as the color of the first color region;

establishing the coordinates of the first pixel as the reference coordinates of the first color region;

selecting a second pixel of the plurality of pixels of the image, wherein the second pixel is adjacent to the first pixel;

if the second pixel is the same color as the first pixel, assigning the second pixel to the first color region; and if the color of the second pixel is different than the color of the first pixel:

assigning the second pixel to a second color region, establishing the color of the second pixel as the color of the second color region, and establishing the coordinates of the second pixel as the reference coordinates of the second color region.

35. The medium of claim 34, herein characterizing the image of the unidentified object by dividing the image into a plurality of color regions further comprises examining each of the remaining pixels of the plurality of pixels of the image and assigning each remaining pixel either to a color region of an adjacent pixel or to a new color region.

36. The medium of claim 31, wherein the data further comprises instructions causing the processor to perform operations comprising obtaining digital image data for the unidentified object.

37. The medium of claim 31, wherein the unidentified object comprises a three-dimensional object.

38. The medium of claim 31, wherein capturing the image of the unidentified object comprises capturing the image of the unidentified object as a frame of video signals.

39. The medium of claim 31, the data further comprises instructions causing the processor to perform operations comprising generating an output response in accordance with the result of identifying the unidentified object.

40. A machine-readable medium having stored thereon data representing sequences of instructions that, when executed by a processor, cause the processor to perform operations comprising:

capturing an image of each of a plurality of known objects;

characterizing each image of the plurality of known objects by dividing each image into a plurality of color regions;

capturing an image of an unidentified object;

characterizing the image of the unidentified object by dividing the image of the unidentified object into a plurality of color regions, comprising:

identifying the color of each of a plurality of pixels of the image, assigning each of the plurality of pixels of the image to one of the plurality of color regions of the image, selecting a first pixel of the plurality of pixels of the image and assigning the first pixel to a first color region;

establishing the color of the first pixel as the color of the first color region;

establishing the coordinates of the first pixel as the reference coordinates of the first color region;

selecting a second pixel of the plurality of pixels of the image, wherein the second pixel is adjacent to the first pixel;

if the second pixel is the same color as the first pixel, assigning the second pixel to the first color region; and if the color of the second pixel is different than the color of the first pixel:

assigning the second pixel to a second color region, establishing the color of the second pixel as the color of the second color region, and establishing the coordinates of the second pixel as the reference coordinates of the second color region; and identifying the unidentified object at least in part by comparing the color regions of the image of the unidentified object with the color regions of one or more of the images of the plurality of known objects.

41. The medium of claim 40, wherein characterizing the image of the unidentified object by dividing the image into a plurality of color regions further comprises examining each of the remaining pixels of the plurality of pixels of the image and assigning each remaining pixel either to a color region of an adjacent pixel or to a new color region.

42. The medium of claim 40, wherein the data further comprises instructions causing the processor to perform operations comprising obtaining digital image data for the unidentified object.

43. The medium of claim 40, wherein the unidentified object comprises a three-dimensional object.

44. The medium of claim 40, wherein capturing the image of the unidentified object comprises capturing the image of the unidentified object as a frame of video signals.

45. The medium of claim 40, the data further comprises instructions causing the processor to perform operations comprising generating an output response in accordance with the result of identifying the unidentified object.

* * * * *